United States Patent
Han et al.

(10) Patent No.: US 8,438,218 B2
(45) Date of Patent: May 7, 2013

(54) APPARATUS AND METHOD FOR PROVIDING ACCESSIBLE HOME NETWORK INFORMATION IN REMOTE ACCESS ENVIRONMENT

(75) Inventors: Se-Hee Han, Seoul (KR); Joo-Yeol Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 292 days.

(21) Appl. No.: 12/738,802

(22) PCT Filed: Mar. 11, 2008

(86) PCT No.: PCT/KR2008/001370
§ 371 (c)(1),
(2), (4) Date: Apr. 19, 2010

(87) PCT Pub. No.: WO2009/051310
PCT Pub. Date: Apr. 23, 2009

(65) Prior Publication Data
US 2010/0250663 A1 Sep. 30, 2010

(30) Foreign Application Priority Data
Oct. 17, 2007 (KR) .................. 10-2007-0104610

(51) Int. Cl.
*G06F 15/16* (2006.01)
(52) U.S. Cl.
USPC ........... 709/203; 709/202; 709/219; 709/223; 709/227; 709/228; 709/229
(58) Field of Classification Search .................. 709/202, 709/203, 219, 223, 227, 228, 229
See application file for complete search history.

(56) References Cited

U.S. PATENT DOCUMENTS

| 7,117,526 | B1 | 10/2006 | Short |
| 2003/0176188 | A1 | 9/2003 | O'Neill |
| 2004/0023653 | A1 | 2/2004 | O'Neill |
| 2004/0133689 | A1* | 7/2004 | Vasisht .................. 709/228 |

(Continued)

FOREIGN PATENT DOCUMENTS

| EP | 2 288 082 | 2/2011 |
| KR | 1020070018196 A | 2/2007 |

(Continued)

OTHER PUBLICATIONS

PCT/ISA/237 (5pp); Written Opinion of PCT/KR2008/001370.

(Continued)

*Primary Examiner* — Liangche A Wang
(74) *Attorney, Agent, or Firm* — The Farrell Law Firm, P.C.

(57) ABSTRACT

Provided is an apparatus and method for providing accessible home network information regarding one or more home networks that can be accessed from a remote access (RA) environment. The apparatus includes a channel-creation module which creates a communication channel via which an RA client and an in-home RA server can communicate with each other; an information-management module which issues a request for capability information, a credential list and a profile list to each of the RA client and the in-home RA server; and an information-generation module which generates channel-creation information for creating a communication channel between the RA client and the in-home RA server based on the capability information.

12 Claims, 5 Drawing Sheets

U.S. PATENT DOCUMENTS

| | | |
|---|---|---|
| 2005/0041650 A1 | 2/2005 | O'Neill |
| 2005/0286466 A1 | 12/2005 | Tagg et al. |
| 2006/0111102 A1 | 5/2006 | O'Neill |
| 2007/0214241 A1 | 9/2007 | Song et al. |
| 2008/0176538 A1* | 7/2008 | Terrill et al. ............... 455/414.1 |
| 2008/0215736 A1* | 9/2008 | Astrom et al. ............... 709/226 |
| 2009/0225688 A1 | 9/2009 | O'Neill |
| 2009/0235299 A1* | 9/2009 | Astrom et al. ............... 725/25 |
| 2009/0247155 A1 | 10/2009 | O'Neill |
| 2010/0115103 A1 | 5/2010 | Tagg |
| 2010/0115104 A1 | 5/2010 | Tagg |

FOREIGN PATENT DOCUMENTS

| | | |
|---|---|---|
| KR | 1020070048658 A | 5/2007 |
| WO | WO 02/057869 | 7/2002 |
| WO | WO 03/067384 | 8/2003 |
| WO | WO 03/067439 | 8/2003 |

OTHER PUBLICATIONS

PCT/ISA/210 (2pp); International Searh Report of PCT/KR2008/001370.

Belimpasakis et al.: "Remote Access to Universal Plug and Play (UPnP) Devices Utilizing the Atom Publishing Protocol", 3rd Int'l Conference on Networking and Services, 2007.

Kim et al., "Implementation of the DLNA Proxy System for Sharing Home Media Contents", IEEE Transactions on Consumer Electronics, Feb. 1, 2007.

* cited by examiner

APPARATUS AND METHOD FOR PROVIDING ACCESSIBLE HOME NETWORK INFORMATION IN REMOTE ACCESS ENVIRONMENT

TECHNICAL FIELD

The present invention relates to an apparatus and method for providing accessible home network information regarding one or more home networks that can be accessed from a remote access (RA) environment, and, more particularly, to an apparatus and method for providing accessible home network information regarding one or more home networks that can be accessed from an RA environment, in which a public RA server in a public network provides an RA client in an external network with service information and accessible home network information.

BACKGROUND ART

In general, home networks include Internet Protocol (IP)-based private networks and allow various types of personal computers (PCs), intellectual appliances, and wireless devices that can be used in homes to be connected to a single network and thus to be effectively controlled. Examples of protocols for home networks include Universal Plug and Play (UPnP) and Web Service.

UPnP is an architecture for pervasive peer-to-peer network connectivity between nearly all types of intellectual appliances, wireless devices and PCs. UPnP is designed to bring easy-to-use, flexible, standards-based connectivity to ad-hoc or unmanaged networks created in homes, small businesses, or public spaces. UPnP provides a distributed, open networking architecture that enables Transmission Control Protocol/Internet Protocol (TCP/IP) and web technologies to realize seamless proximity networking. UPnP Device Architecture defines a control point (CP), which is a control device, and a controlled device (CD), which is controlled by a CP.

Korean Patent Laid-Open Gazette No. 2003-055766 discloses an apparatus and method for controlling devices in a private network from a public network, in which devices in a private network can be effectively controlled from a public network such as the Internet by translating Universal Resource Locator (URL) information of UPnP devices in a home network using Network Address Translation (NAT), and providing a client in the public network with the translated URL information. However, no methods have yet been suggested in which a public remote access (RA) server provides an RA client in an external network with accessible home network information.

DISCLOSURE OF INVENTION

Technical Problem

The present invention allows a public remote access (RA) server to provide an RA client in an external network with accessible home network information.

The present invention also allows a user to access a home network from outside his/her home with the aid of an RA client in an external network, and to use services provided by the home network.

However, the objectives of the present invention are not restricted to the ones set forth herein. The above and other objectives of the present invention will become apparent to one of daily skill in the art to which the present invention pertains by referencing the detailed description of the present invention given below.

Technical Solution

According to an aspect of the present invention, there is provided an apparatus for providing accessible home network information regarding one or more home networks that can be accessed from a remote access (RA) environment, the apparatus including a channel-creation module which creates a communication channel via which an RA client and an in-home RA server can communicate with each other; an information-management module which issues a request for capability information, a credential list and a profile list to each of the RA client and the in-home RA server; and an information-generation module which generates channel-creation information for creating a communication channel between the RA client and the in-home RA server based on the capability information.

According to another aspect of the present invention, there is provided a method of providing accessible home network information regarding one or more home networks that can be accessed from an RA environment, the method including creating a communication channel via which an RA client and an in-home RA server can communicate with each other; if the RA client is connected to the RA server through the communication channel, allowing the RA client to search for accessible home network information and providing the identified accessible home network information to the RA client; generating channel-creation information for creating a communication channel between the RA client and an in-home RA server of a home network selected by the RA client; and transmitting the generated information to the RA client and the server based on the capability information.

According to another aspect of the present invention, there is provided a method of providing accessible home network information regarding one or more home networks that can be accessed from an RA environment, the method including issuing a request for a list of accessible home networks to a public RA server; receiving a list of accessible home networks from the public RA server and selecting one of the home networks in the received accessible home network list; receiving credential information and profile information regarding the selected home network from the public RA server; and creating a communication channel for communicating with an in-home RA server of the selected home network based on the credential information and the profile information.

MODE FOR THE INVENTION

The present invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

Figure 1:
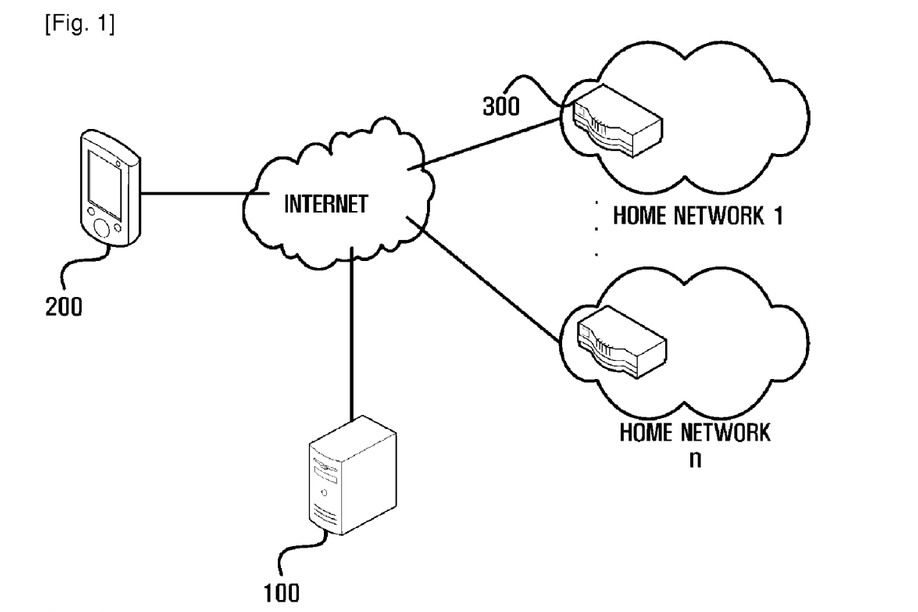
FIG. 1 illustrates a schematic diagram of a system for providing accessible home network information regarding one or more home networks that can be accessed from a remote access (RA) environment, according to an embodiment of the present invention.

FIG. 1 illustrates a schematic diagram of a system for providing accessible home network information regarding one or more home networks that can be accessed from a remote access (RA) environment, according to an embodiment of the present invention. Referring to FIG. 1, the system operates based on Universal Plug and Play (UPnP) RA Architecture Ver 1.0.

Referring to FIG. 1, the system includes a public RA server 100, an RA client 200 and a plurality of in-home RA servers 300.

The RA client 200 resides in an external network. The RA client 200 accesses the public RA server 100, and is thus provided with device information regarding a number of devices that exist in a home network and service information regarding one or more services that are available in a home network. In this manner, the RA client 200 may use services that are provided by a home network. The RA client 200 may be a device which can access and communicate with a network.

The in-home RA servers 300 are located in corresponding home networks. Each of the in-home RA servers 300 collects device information and service information, and transmits the collected information to the public RA server 100.

The public RA server 100 creates an RA Transport Agent (RATA) channel, which is a type of Virtual Private Network (VPN) channel, for the RA client 200 or an in-home RA server 300, and is provided with capability information, a credential list and a profile list through the RATA channel by each of the RA client 200 and the in-home RA server 300. The capability information is information regarding settings for allowing the RA client 200 and an in-home RA server 300 to access each other through an RATA channel, the credential list is a list of credential information (e.g., passwords and identifiers (IDs)) that is referenced by profile information, and the profile list is a list of profile information that is used by the RA client 200 and an in-home RA server 300 for creating an RATA channel therebetween.

The public RA server 100 may provide a list of accessible home networks, device information and service information upon the request of the RA client 200.

The public RA server 100 generates profile information and then credential information necessary for creating a communication channel via which the RA client 200 and an in-home RA server 300 can communicate with each other. The profile information and the credential information may be transmitted to the RA client 200 and an in-home RA server 300, and the RA client 200 may use the profile information and the credential information to create an RATA channel for the in-home RA server 300.

Figure 2:
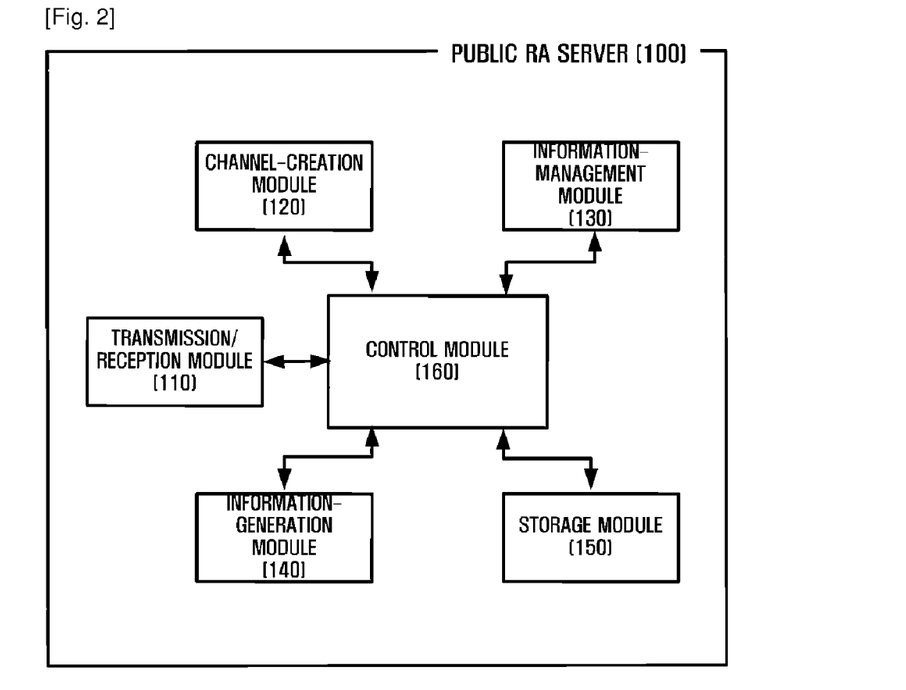
FIG. 2 illustrates a block diagram of an apparatus for providing accessible home network information regarding one or more home networks that can be accessed from an RA environment, according to an embodiment of the present invention.

FIG. 2 illustrates a block diagram of an apparatus for providing accessible home network information regarding one or more home networks that can be accessed from an RA environment, according to an embodiment of the present invention, i.e., a public RA server 100. Referring to FIG. 2, the public RA server 100 includes a transmission/reception module 110, a channel-creation module 120, an information-management module 130, an information-generation module 140, a storage module 150 and a control module 160.

The term "module", as used herein, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The transmission/reception module 110 receives capability information, a credential list and a profile list transmitted by each of an RA client 200 and an in-home RA server 300.

The transmission/reception module 110 transmits a list of accessible home networks and service information upon the request of the RA client 200.

The channel-creation module 120 creates a communication channel between the RA client 200 and the in-home RA server 300 upon the request of the RA client 200 and the in-home RA server 300. The channel created by the channel-creation module 120 may be an RATA channel. Specifically, the channel-creation module 120 creates a communication channel for the RA client 200 when a user wishes to access a home network. In contrast, the channel-creation module 120 creates a communication channel to the in-home RA server 300 when a new device is installed in a home network. The channel created by the channel-creation module 120 may have to be maintained until the operation of the in-home RA server 300 is terminated. Capability information of the in-home RA server 300 may be transmitted to the public RA server 100 via the communication channel created by the channel-creation module 120. Then, the public RA server 100 may issue a request for access to the in-home RA server 300 using the capability information of the in-home RA server 300.

An RATA channel may be created among the public RA server 100, the RA client 200 and the in-home RA server 300 using one of the following three methods.

First, the public RA server 100 may provide a user of the RA client 200 and the in-home RA server 300 with credential information and profile information necessary for accessing the public RA server 100 during the registration of the remote RA client 200 with the public RA server 100. The public RA server 100 may use a secure sockets layer (SSL) to provide the credential information and the profile information to the user. Then, the user may store the credential information and the profile information provided by the public RA server 100 in the RA client 200 and the in-home RA server 300.

Second, a temporary RATA channel may be created for acquiring, from the public RA server 100, profile information and credential information necessary for accessing the in-home RA server 300. The temporary RATA channel may be created using SSL or Kerberos.

Third, an RATA channel may be created by a management console of the RA client 200. That is, the management console of the RA client 200 may acquire profile information and credential information necessary for accessing the public RA server 100 using an out-of-band method, and provide the acquired information to the RA client 200 and the in-home RA server 300.

The information-management module 130 manages capability information, credential lists, and profile lists provided by the RA client 200 and the in-home RA server 300.

Specifically, the information-management module 130 may issue a request for capability information, a credential list, and a profile list to the RA client 200 and the in-home RA server 300, receive capability information, a credential list, and a profile list from each of the RA client 200 and the in-home RA server 300 and manage the received information.

If the RA client 200 is connected to the public RA server 100, the information-management module 130 searches for device information regarding one or more devices that can be used by the RA client 200 and service information regarding one or more services that can be used by the RA client 200, and provides the RA client 200 with the identified device information, the identified service information and a list of accessible home networks that can be accessed by the RA client 200. The home networks that can be accessed by the RA client 200 may be set in advance during the registration of the user of the RA client 200 and the in-home RA server 300 with the public RA server 100. An example of the list of the home networks that can be accessed by the RA client 200 and an example of the device information regarding the devices that can be used by the RA client 200 will be described later in detail with reference to FIGS. 3 through 5.

The information-generation module 140 generates profile information and then credential information necessary for creating a communication channel via which the RA client 200 and the in-home RA server 300 can communicate with each other.

For example, the information-generation module 140 selects capability information that can be used by both the RA client 200 and the in-home RA server 300 by matching capability information provided by the RA client 200 and capability information provided by the in-home RA server 300.

Thereafter, the information-generation module 140 generates profile information that can use the selected capability information, and then generates credential information necessary for creating a communication channel via which the RA client 200 and the in-home RA server 300 can communicate with each other.

The storage module 150 stores capability information, credential lists and profile lists provided by the RA client 200 and the in-home RA server 300. In addition, the storage module 150 stores the communication channel created by the channel-creation module 120 and the profile information and the credential information generated by the information-generation module 140.

When a request for a connection is received from the RA client 200 and the in-home RA server 300, the control module 160 authenticates the user of the RA client 200 and the in-home RA server 300.

In addition, the control module 160 controls the operations of the transmission/reception module 110, the channel-creation module 120, the information-management module 130, the information-generation module 140, and the storage module 150.

Figure 3:
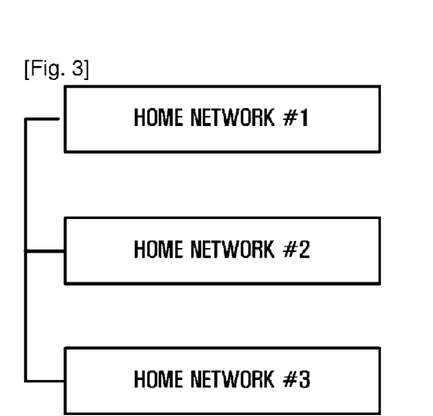
FIGS. 3 through 5 illustrate diagrams of an accessible home network list, Universal Plug and Play (UPnP) device information, and settings information provided to an RA client by a public RA server.
Figure 4:
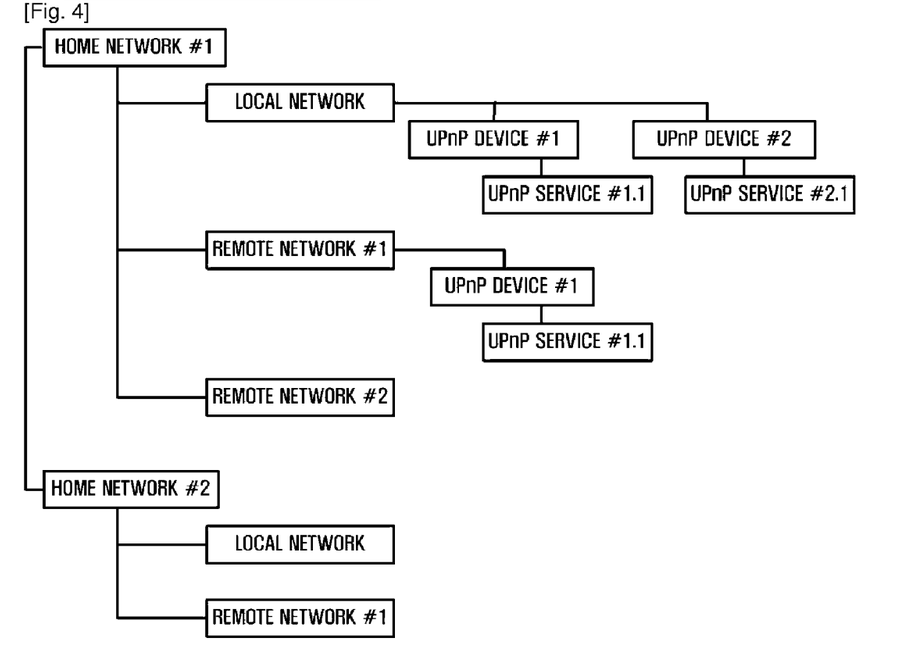
Figure 5:
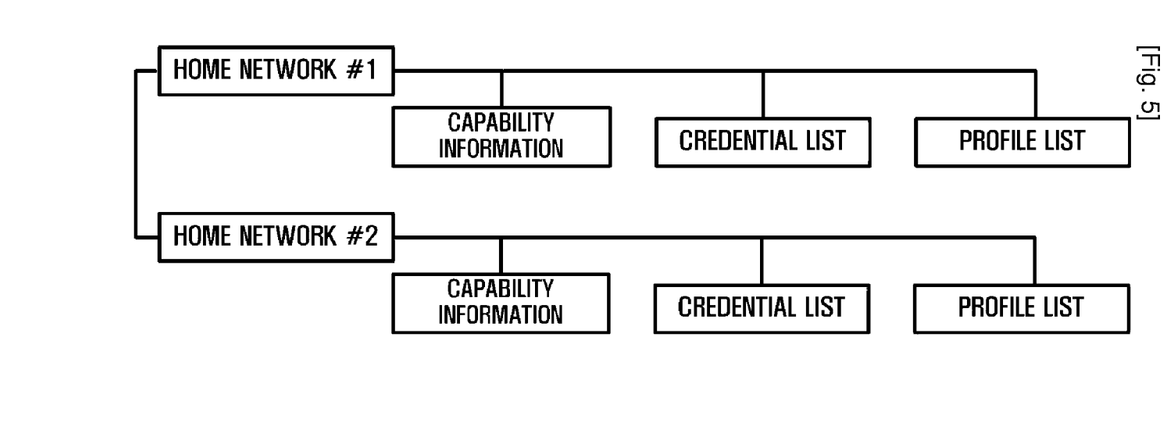

FIGS. 3 through 5 illustrate diagrams of a home network list, UPnP device information, and settings information provided to the RA client 200 by a public RA server 100.

Referring to FIG. 3, the public RA server 100 may provide the RA client 200 with a list of home networks that can be used by the RA client 200, i.e., a list of home networks 1, 2, and 3.

Referring to FIG. 4, the public RA server 100 may provide the RA client 200 not only with a list of, for example, home networks 1 and 2 that can be used by the RA client 200 but also with a list of, for example, UPnP devices that can be used by the RA client 200, and a list of, for example, UPnP services 1.1 and 2.1.

Referring to FIG. 5, the public RA server 100 may provide the RA client 200 with a list of, for example, home networks 1 and 2 that can be used by the RA client 200 and settings information such as capability information, credential lists, and profile lists.

Therefore, the RA client 200 may be provided with any desired information (for example, a list of home networks that can be accessed and lists of devices and services that can be used) by the public RA server 100. Thus, the RA client 200 may be able to access any desired home network and to be provided with any desired service, even when the RA client 200 does not have capability information of each of a plurality of home networks that are available.

Figure 6:
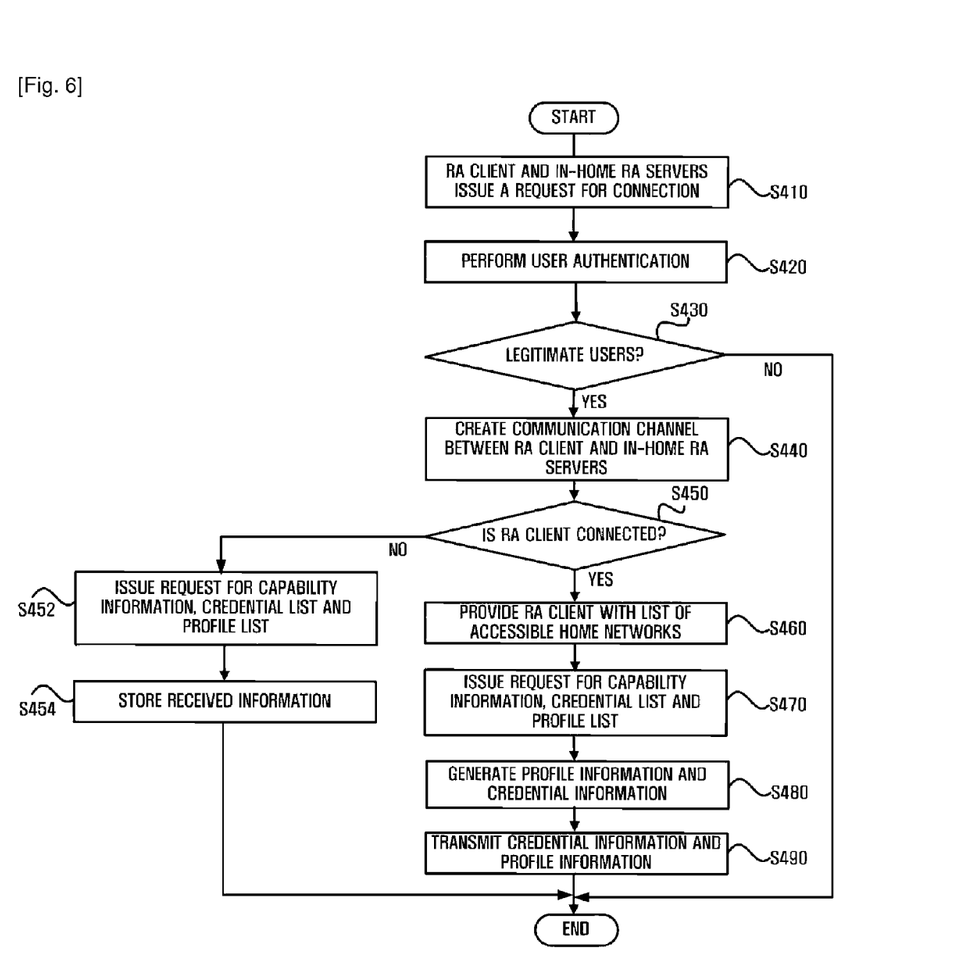
FIG. 6 illustrates a flowchart of a method of providing accessible home network information regarding one or more home networks that can be accessed from an RA environment, according to an embodiment of the present invention, i.e., an operation of a public RA server.

FIG. 6 illustrates a flowchart of a method of providing accessible home network information regarding one or more home networks that can be accessed from an RA environment, according to an embodiment of the present invention, i.e., an operation of the public RA server 100. Referring to FIG. 6, the public RA server 100 is open to the public. Thus, assume that the RA client 200 and the in-home RA servers 300 already have URL information of the public RA server 100 and credential information and profile information necessary for creating a communication channel.

Referring to FIG. 6, the RA client 200 and the in-home server 300 issue a request for a connection to the public RA server 200 (S410). Then, the control module 160 of the public RA server 100 performs user authentication on users of the RA client 200 and the in-home RA servers 300 (S420).

If the users of the RA client 200 and the in-home RA servers 300 are determined to be legitimate users (S430), the channel-creation module 120 of the public RA server 100 creates a communication channel (for example, an RATA channel) through which the RA client 200 and the in-home RA servers 300 can communicate with each other (S440).

Then, if the RA client 200 is connected to the public RA server 100 (S450), the public RA server 100 searches for accessible home network information regarding one or more home networks that can be accessed by the RA client 200.

Thereafter, the information-management module 130 of the public RA server 100 provides the RA client 200 with a list of the home networks that can be accessed by the RA client 200 upon the request of the RA client 200 (S460). The public RA server 100 may also provide the RA client 200 with device information regarding one or more devices that can be used, service information regarding one or more services that can be used, and settings information.

Thereafter, if the RA client 200 selects a home network, the public RA server 100 issues a request for capability information, a credential list and a profile list to the RA client 200

(S470). The information-generation module 140 of the public RA server 100 receives capability information, a credential list and a profile list from the RA client 200 and selects capability information that can be used by both the RA client 200 and an in-home RA server 300 of the selected home network by matching the capability information of the RA client 200 and capability information of the in-home RA server 300 of the selected home network.

Thereafter, profile information that can use the selected capability information is generated, and credential information to be used for creating a communication channel through which the RA client 200 and the in-home RA server 300 of the selected home network can communicate with each other is generated (S480).

Thereafter, the public RA server 100 transmits the profile information and the credential information obtained in operation S480 to the RA client 200 and the in-home RA server 300 of the selected home network through the transmission/reception module 110.

In contrast, if an in-home RA server 300 is connected to the public RA server 100 (S450), the information-management module 130 of the public RA server 100 issues a request for capability information, a credential list and a profile list to the in-home RA server 300 (S452).

Thereafter, the information-management module 130 of the public RA server 100 receives capability information, a credential list and a profile list from the in-home RA server 300, and stores the received information therein (S454). The capability information of the in-home RA server 300 may be used to generate profile information and credential information necessary for creating a communication channel, as performed in operation S480.

If the users of the RA client 200 and the in-home RA servers 300 are determined not to be legitimate users (S430), the public RA server 100 terminates the connection between the RA client 200 and the in-home RA servers 300.

Figure 7:
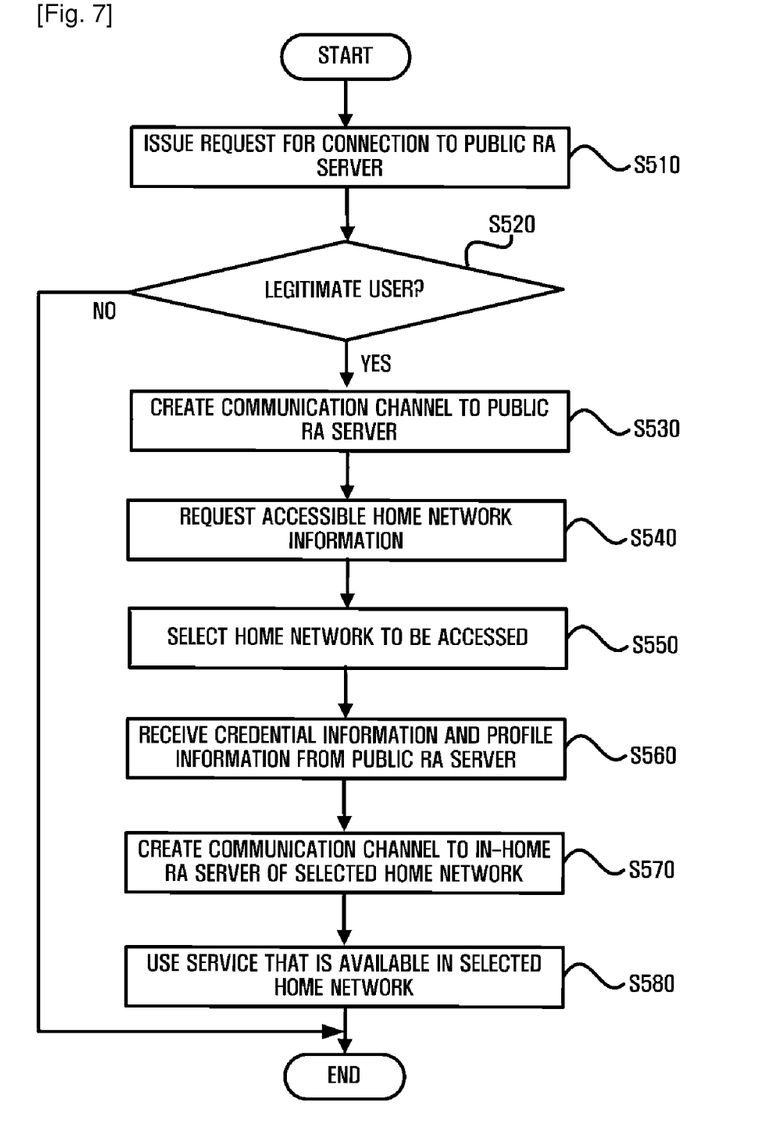
FIG. 7 illustrates a flowchart of a method of providing accessible home network information regarding one or more home networks that can be accessed from an RA environment, according to another embodiment of the present invention, i.e., an operation of an RA client.

FIG. 7 illustrates a flowchart of a method of providing accessible home network information regarding one or more home networks that can be accessed from an RA environment, according to another embodiment of the present invention, i.e., an operation of the RA client 200. Referring to FIG. 7, the RA 200 issues a request for a connection to the public RA server 100 (S510). Then, the public RA server 100 performs user authentication on the user of the RA client 200, and transmits the result of the user authentication to the RA client 200.

Thereafter, if the user of the RA client 200 is determined to be a legitimate user (S520), the RA client 200 creates a communication channel to the public RA server 100 (S530).

Thereafter, the RA client 200 issues, to the public RA server 100, a request for a list of accessible home networks (S540). Then, the RA client 200 receives a list of accessible home networks from the public RA server 100, and selects one of the home networks in the received accessible home network list (S550).

Thereafter, the RA client 200 receives credential information and profile information regarding the selected home network from the public RA server 100 (S560), and creates a communication channel to an in-home RA server 300 of the selected home network based on the received information (S570).

Thereafter, the RA client 200 accesses the selected home network through the communication channel obtained in operation S570), and thus uses a device and a service that are available in the selected home network (S580).

If the user of the RA client 200 is determined not to be a legitimate user (S520), the connection between the RA client 200 and the public RA server 100 may be terminated.

INDUSTRIAL APPLICABILITY

As described above, the apparatus and method for providing accessible home network information regarding one or more home networks that can be accessed from an RA environment, according to the present invention have the following advantages.

First, since a public RA server provides an RA client with accessible home network information, the RA client can access a desired home network and thus use a desired service without the need to store address information of the desired home network.

Second, it is possible for a user to access a home network and use a service from an external network via his/her RA client.

The invention claimed is:

1. An apparatus for providing accessible home network information regarding one or more home networks that can be accessed from a remote access (RA) environment, the apparatus comprising:
a channel-creation module which creates a communication channel via which an RA client and an in-home RA server can communicate with each other;
an information-management module which issues a request for capability information, a credential list and a profile list to each of the RA client and the in-home RA server;
an information-generation module which generates channel-creation information for creating a communication channel between the RA client and the in-home RA server based on the capability information; and
a transmission/reception hardware module for transmitting the request to each of the RA client and the in-home RA server and receiving the capability information from each of the RA client and the in-home RA server.

2. The apparatus of claim 1, wherein the communication channel is an RA Transport Agent (RATA) channel.

3. The apparatus of claim 1, wherein the channel-creation information comprises profile information and credential information.

4. The apparatus of claim 1, wherein the apparatus is based on Universal Plug and Play (UPnP) RA Ver 1.0.

5. A method of providing accessible home network information regarding one or more home networks that can be accessed from an RA environment, the method comprising:
creating a communication channel via which an RA client and an in-home RA server can communicate with each other;
if the RA client is connected through the communication channel, allowing the RA client to search for accessible home network information and providing the identified accessible home network information to the RA client;
transmitting a request for capability information, a credential list, and a profile list to each of the RA client and the in-home RA server of the selected home network;
receiving the requested capability information, a credential list, and a profile list from each of the RA client and the in-home RA server of the selected home network;
generating channel-creation information for creating a communication channel between the RA client and an in-home RA server of a home network selected by the RA client; and transmitting the generated information, based on the received capability information, to the RA client.

6. The method of claim 5, wherein generating the channel-creation information comprises:
   selecting capability information that can be used by both the RA client and the in-home RA server of the selected home network by matching capability information of the RA client and capability information of the in-home RA server of the selected home network;
   generating profile information that can use the selected capability information; and
   generating credential information that can be used to create a communication channel between the RA client and the in-home RA server of the selected home network.

7. The method of claim 5, wherein the communication channel is an RATA channel.

8. The method of claim 5, wherein the method is based on Universal Plug and Play (UPnP) RA Ver 1.0.

9. A method of providing accessible home network information regarding one or more home networks that can be accessed from an RA environment, the method comprising:
   issuing a request for a list of accessible home networks to a public RA server;
   receiving a list of accessible home networks from the public RA server and selecting one of the home networks in the received accessible home network list;
   receiving a request for capability information, a credential list, and a profile list from the public RA server;
   transmitting the requested capability information, credential list, and profile list to the public RA server;
   receiving credential information and profile information regarding the selected home network from the public RA server; and
   creating a communication channel for communicating with an in-home RA server of the selected home network based on the credential information and the profile information.

10. The method of claim 9, further comprising accessing the selected home network through the communication channel and using a service that is available in the selected home network.

11. The method of claim 9, wherein the communication channel is an RATA channel.

12. The method of claim 9, wherein the method is based on UPnP RA Ver 1.0.

* * * * *